(12) United States Patent
Akirekadu et al.

(10) Patent No.: US 9,158,650 B2
(45) Date of Patent: Oct. 13, 2015

(54) MOBILE APPLICATION PERFORMANCE MANAGEMENT

(75) Inventors: Ashwath Narayan Akirekadu, Laurel, MD (US); Dinesh Harischandra Bhat, Sterling, VA (US); Michael J. Gaffney, Perry Hall, MD (US); Mitchell F. Berk, Washington, DC (US); William R. Fiste, III, Columbia, MD (US); Carey Alan Snyder, Vienna, VA (US)

(73) Assignee: Boxtone, Inc., Columbia, MD (US)

( * ) Notice: Subject to any disclaimer, the term of this patent is extended or adjusted under 35 U.S.C. 154(b) by 0 days.

(21) Appl. No.: 13/105,478

(22) Filed: May 11, 2011

(65) Prior Publication Data

US 2012/0036498 A1 Feb. 9, 2012

Related U.S. Application Data

(60) Provisional application No. 61/370,482, filed on Aug. 4, 2010.

(51) Int. Cl.
| | |
|---|---|
| G06F 9/44 | (2006.01) |
| G06F 11/34 | (2006.01) |
| G06F 11/07 | (2006.01) |
| G06F 11/30 | (2006.01) |

(52) U.S. Cl.
CPC ........ *G06F 11/3409* (2013.01); *G06F 11/0742* (2013.01); *G06F 11/0748* (2013.01); *G06F 11/0781* (2013.01); *G06F 11/3013* (2013.01); *G06F 11/3082* (2013.01); *G06F 11/3495* (2013.01); *G06F 11/0793* (2013.01)

(58) Field of Classification Search
None
See application file for complete search history.

(56) References Cited

U.S. PATENT DOCUMENTS

| | | | |
|---|---|---|---|
| 6,542,739 B1* | 4/2003 | Garner | 455/427 |
| 6,606,744 B1* | 8/2003 | Mikurak | 717/174 |
| 6,801,940 B1* | 10/2004 | Moran et al. | 709/224 |
| 7,555,306 B2* | 6/2009 | Liu | 455/522 |
| 7,788,644 B2* | 8/2010 | Koduru et al. | 717/127 |
| 7,877,735 B2* | 1/2011 | Todorova et al. | 717/131 |
| 7,917,641 B2* | 3/2011 | Crampton | 709/229 |
| 8,010,100 B2* | 8/2011 | Kushwaha et al. | 455/423 |
| 8,081,930 B2* | 12/2011 | Lewallen | 455/67.11 |
| 8,087,001 B2* | 12/2011 | Hoyek et al. | 717/124 |
| 8,174,381 B2* | 5/2012 | Imes et al. | 340/539.23 |
| 8,208,893 B1* | 6/2012 | Ryan | 455/405 |
| 8,527,956 B2* | 9/2013 | Bell et al. | 717/127 |
| 8,572,593 B2* | 10/2013 | Vedula | 717/153 |
| 2003/0110480 A1* | 6/2003 | Rajaram | 717/140 |
| 2007/0043863 A1* | 2/2007 | Schlesener et al. | 709/225 |
| 2007/0186212 A1* | 8/2007 | Mazzaferri et al. | 718/1 |

(Continued)

*Primary Examiner* — Don Wong
*Assistant Examiner* — Hossain Morshed
(74) *Attorney, Agent, or Firm* — EIP US LLP

(57) ABSTRACT

In one embodiment, a non-transitory processor-readable medium stores code representing instructions that when executed cause a processor to receive a first signal including a performance datum associated with a first mobile application resident at a mobile device. The code can further represent instructions that when executed cause the processor to receive a second signal including a performance datum associated with a second mobile application resident at the mobile device. The code can further represent instructions that when executed cause the processor to send, based on the first signal and the second signal, a third signal including at least one performance metric based at least in part on the performance datum associated with the first mobile application and the performance datum associated with the second mobile application.

18 Claims, 5 Drawing Sheets

(56) References Cited

U.S. PATENT DOCUMENTS

| | | | |
|---|---|---|---|
| 2007/0239718 A1* | 10/2007 | Baxter et al. | 707/8 |
| 2008/0109684 A1* | 5/2008 | Addleman et al. | 714/47 |
| 2008/0313384 A1* | 12/2008 | Angerbauer et al. | 711/100 |
| 2009/0007078 A1* | 1/2009 | Hoyek et al. | 717/131 |
| 2009/0063267 A1* | 3/2009 | Dubinko et al. | 705/14 |
| 2009/0156315 A1* | 6/2009 | Andersson et al. | 463/43 |
| 2009/0178032 A1* | 7/2009 | Yang et al. | 717/151 |
| 2010/0042976 A1* | 2/2010 | Hines | 717/127 |
| 2011/0307323 A1* | 12/2011 | Kuhn et al. | 705/14.42 |
| 2011/0307904 A1* | 12/2011 | Malnati | 719/313 |
| 2012/0021753 A1* | 1/2012 | Damnjanovic et al. | 455/450 |
| 2012/0028603 A1* | 2/2012 | Gorman et al. | 455/408 |
| 2012/0036498 A1* | 2/2012 | Akirekadu et al. | 717/124 |
| 2012/0036552 A1* | 2/2012 | Dare et al. | 726/1 |
| 2012/0064923 A1* | 3/2012 | Imes et al. | 455/457 |
| 2012/0069131 A1* | 3/2012 | Abelow | 348/14.01 |
| 2012/0172023 A1* | 7/2012 | Griff et al. | 455/418 |
| 2012/0221955 A1* | 8/2012 | Raleigh et al. | 715/736 |

* cited by examiner

MOBILE APPLICATION PERFORMANCE MANAGEMENT

CROSS-REFERENCE TO RELATED APPLICATION

The present application claims priority to U.S. provisional patent application No. 61/370,482 entitled "Mobile Application Performance Management" filed on Aug. 4, 2010, which is hereby incorporated by reference in its entirety.

BACKGROUND

Embodiments described herein relate generally to software performance analysis and management, and more particularly to methods and apparatus for mobile device application performance analysis and management.

Developers of mobile device software applications generally seek to optimize the end-user experience to make an application more desirable to consumers. A key part of this optimization is improving application execution speeds and minimizing performance anomalies and errors. Many software developers perform a series of tests on their applications to discover such errors, often through one or more rounds of user testing of limited-release "alpha" or "beta" versions of an application. However, results of such tests are often insufficiently robust given their relatively limited scope and scale. Thus, many performance anomalies and errors often go undiscovered by mobile application developers, resulting in suboptimal application performance.

Thus, a need exists for methods and apparatus that programmatically gather mobile application performance and error information, correlate the information with other relevant data about the mobile device on which the application is being executed and report the information for subsequent developer analysis. A need further exists for methods and apparatus that gather, correlate and report such information in a manner that minimizes strain on the limited computation hardware and battery resources present in most mobile devices. Such functionality can inform updates and improvements to mobile device applications issued by the developer.

SUMMARY

In one embodiment, a non-transitory processor-readable medium stores code representing instructions that when executed cause a processor to receive a first signal including a performance datum associated with a first mobile application resident at a mobile device. The code can further represent instructions that when executed cause the processor to receive a second signal including a performance datum associated with a second mobile application resident at the mobile device. The code can further represent instructions that when executed cause the processor to send, based on the first signal and the second signal, a third signal including at least one performance metric based at least in part on the performance datum associated with the first mobile application and the performance datum associated with the second mobile application.

DETAILED DESCRIPTION

Figure 1:
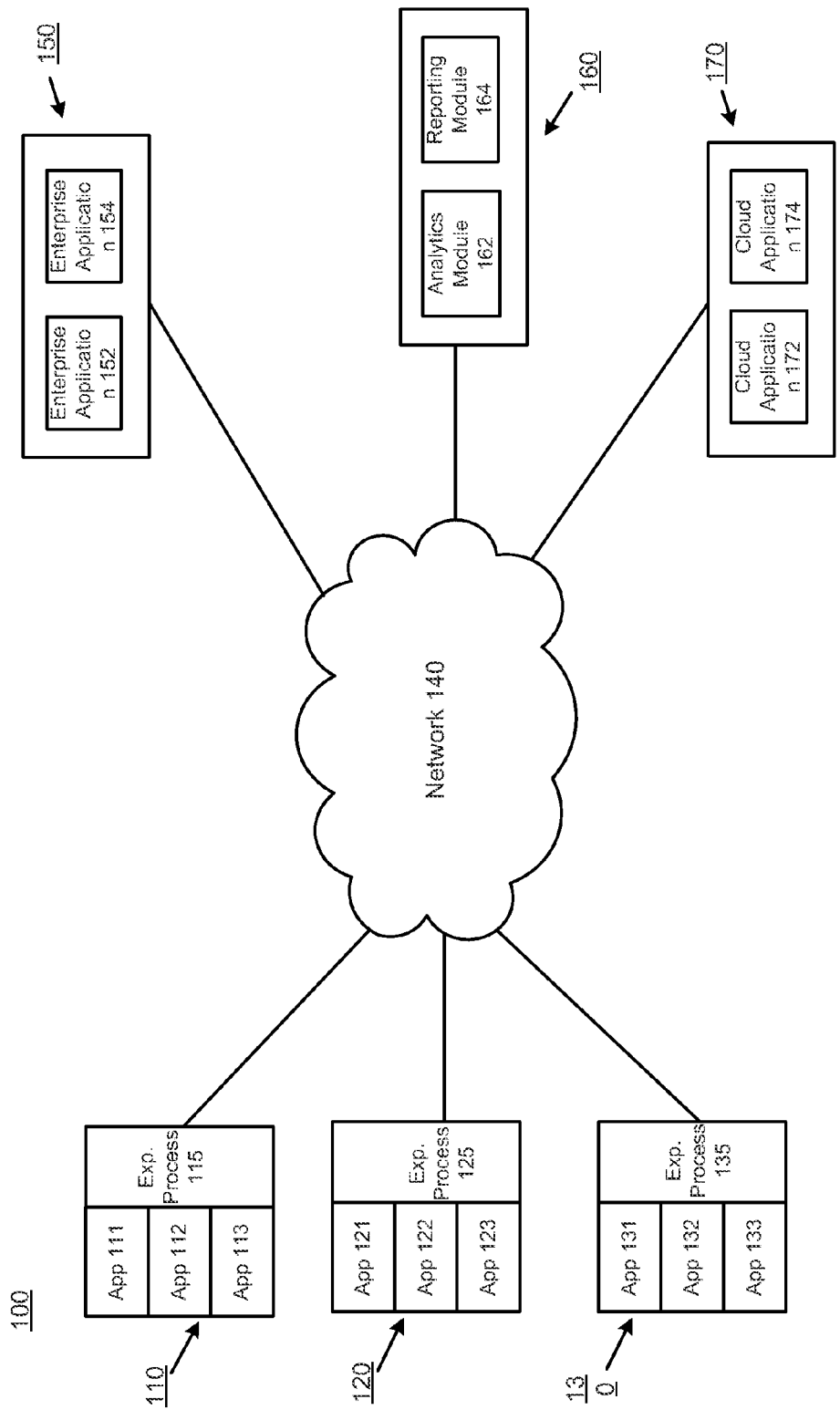
FIG. 1 is a schematic diagram that illustrates a mobile application performance management system, according to an embodiment.

A mobile application performance management system can include one or more mobile devices, each executing one or more mobile applications ("apps"). Any of the one or more mobile devices can execute at least one expert process configured to receive, analyze and/or report performance, error, event and/or other information from one or more mobile apps executing at that mobile device. The expert process can be any combination of hardware and/or software (executing in hardware) instantiated at a mobile device. In some embodiments, the expert process can be a software module resident in memory of a mobile device, and in communication with at least one mobile app instantiated at that mobile device. The expert process can optionally exchange mobile app information (e.g., performance and/or error information) according to a predefined Application Programming Interface (API). The one or more mobile apps can be defined based at least in part on a predefined Software Development Kit (SDK) configured to enable use of the API by a mobile app.

Each of the mobile devices can be configured to exchange information via a network, such as a cellular data network, a wired and/or wireless computer network, etc. For example, each of the mobile devices can be configured to communicate with an enterprise application server via a private enterprise network. Each of the mobile devices can additionally or alternatively be configured to communicate with a cloud application server via, for example, a public network (such as the Internet). Additionally, each of the mobile devices can communicate with a management server via a public or private network. In some embodiments, a mobile enterprise app instantiated at a mobile device can exchange enterprise application data packets with a server-side enterprise application executing at an enterprise application server. In some embodiments, a mobile cloud-based app instantiated at a mobile device can exchange cloud-based application data packets with a cloud-based application executing at a cloud application server.

An expert process executing at a mobile device can optionally perform one or more analytic operations on performance and/or other data (e.g., error data) received from one or more mobile apps to define performance metric information associated therewith. In some embodiments, the expert process can send, via a network, the received performance information and/or calculated performance metric information. For example, an expert process can send performance information associated with a mobile app to a management server. The management server can be any combination of hardware and/or software configured to receive, aggregate, analyze and/or report (e.g., send, display, etc.) performance, performance metric, error, alert, event, and/or other information associated with the one or more mobile devices. In some embodiments, the management server can be physically and/ or logically located within a private network, such as an enterprise network. Alternatively, the management server can be in communication with multiple networks and/or mobile devices associated with multiple organizations and/or entities. In some embodiments, the management server can receive additional mobile app performance information from one or more enterprise application servers and/or cloud-based application servers. In this manner, the management server can receive information from, and/or associated with, various mobile app types.

Upon receipt of mobile app information from an expert process, enterprise application server and/or cloud-based application server, the management server can store the received mobile app information at a memory. In some embodiments, the management server can perform one or more operations on the received information, such as one or more analytic operations configured to calculate average, aggregate, periodic, and/or other metrics associated with the received mobile app data. The management server can then optionally send the calculated performance metrics to a client device for storage and/or display. For example, the management server can send the received and/or calculated information to a client device in response to a user-initiated request or according to a periodic reporting schedule.

The management server can also perform one or more operations in response to a received signal indicating an error or other alert associated with a mobile app. For example, the management server can send a signal to a mobile device at which a mobile app experiencing the error is executing. The signal can include instructions to cause the mobile device and/or the mobile app to change a system, user, or application setting, and/or perform one or more other operations configured to remedy the error.

FIG. 1 is a schematic diagram that illustrates a mobile application performance management system, according to an embodiment. More specifically, FIG. 1 illustrates a mobile application performance management system 100 that includes mobile devices 110, 120 and 130, an enterprise application server 150, a management server 160 and a cloud application server 170, all of which are logically connected via a network 140. As shown in FIG. 1, the mobile devices 110, 120 and 130 each include one or more mobile applications, or "mobile apps" (e.g., mobile apps 111-113, 121-123 and 131-133, stored/executed at the mobile devices 110, 120 and 130, respectively). Each of the mobile devices 110, 120 and 130 also includes at least one expert process (e.g., the expert processes 115, 125 and 135). As also shown in FIG. 1, the enterprise application server 150 includes and/or hosts enterprise applications 152 and 154, and the cloud application server 170 includes and/or hosts cloud applications 172 and 174. The management server 160 includes and/or hosts an analytics module 162 and a reporting module 164. Although not shown in FIG. 1, in some embodiments, the management server 160 can host one or more additional modules configured to allow a user and/or system administrator of the mobile application performance management system 100 to take one or more actions with respect to one or more of the mobile devices 110, 120 and 130. Alternatively or additionally, in some embodiments, the management server 160 can host, include and/or instantiate one or more additional modules configured to receive error and/or anomaly information associated with a mobile device, and automatically execute one or more operations configured to cure the indicated problem and/or anomaly.

Each or any of the mobile devices 110, 120 and 130 can be any application-enabled mobile device capable of exchanging information with other computing devices via a communications network. For example, the mobile devices 110, 120 and 130 can each be any of: a cellular telephone, smartphone, personal digital assistant (PDA), laptop, notebook, netbook or tablet computer, smart meter, or other fixed or portable communication and/or computing device. The mobile devices 110, 120 and 130 can each include communication hardware and/or software configured to send information to and/or receive information from other computing devices, such as the other computing devices disclosed herein. Although three mobile devices are shown in FIG. 1, in some embodiments any non-zero number of mobile devices may be included in the mobile application performance management system 100.

Each of the expert processes 115, 125 and 135 included in the mobile devices 110, 120 and 130, respectively, can be any combination of hardware and/or software (executing in hardware) configured to receive, measure, calculate and/or report information associated with a mobile app. For example, the expert process 115 executing on the mobile device 110 can be configured to receive performance, error, anomaly, alert, event and/or feature information associated with one or more of the mobile apps 121-123. More specifically, the expert process 115 can receive the above-described information in accordance with one or more predefined protocols and/or communication standards, such as an Application Programming Interface (API) defined for communication between a mobile app and an expert process such as the expert process 115. In some embodiments, the expert processes 115, 125 and 135 can receive the above-described information according to a predetermined and/or predefined schedule. Alternatively, the expert processes 115, 125 and 135 can receive performance information from one or more mobile apps in response to the occurrence of an event (e.g., an error) at one of the mobile apps 111-113, 121-123 and 131-133, respectively. In the example, the expert process 115 can accordingly send this received, measured, calculated and/or reported information to the management server 160 via the network 140. Although not shown in FIG. 1, any of the expert processes 115, 125 and 135 can receive information from any of the enterprise application server 150, the management server 160 and the cloud application server 170, via the network 140. Although not shown in FIG. 1, in some embodiments any of the expert processes 115, 125, and 135 can alternatively be embedded within a mobile application, such as any (e.g., one or more) of the mobile apps 111-113, 121-123 and 131-133, respectively. In such embodiments, the embedded expert process can send information associated with the mobile application in which it is embedded to another expert process operating at the mobile device and/or directly to a server (e.g., the management server 160).

Each or any of the apps 111-113, 121-123 and 131-133 can be a mobile application configured to execute on a mobile device, such as the mobile devices 110, 120 and 130, respectively. One or more of the mobile apps 111-113, 121-123 and 131-133 can be a client-side mobile app associated with an enterprise application, such as one of the enterprise applications 152 and 154 (described below). In some embodiments, one or more of the mobile apps 111-113, 121-123 and 131-133 can be a client-side mobile app associated with a cloud application, such as one of the cloud applications 172 and 174 (described below). Although not shown in FIG. 1, any of the mobile apps 111-113, 121-123 and 131-133 can be configured to send, to an expert process, information associated with that mobile app. For example, the mobile app 122 can optionally send performance, error, event and/or other information to the expert process 125 executing at the mobile device 120. In the example, the expert process 125 can then send the received information, and/or one or more metrics derived therefrom, to the management server 160 via the network 140 (as described further below).

The network 140 can be any computer or information network capable of marshalling and transmitting data between two or more hardware devices. For example, the network 140 can be a local area network (LAN), a wide area network (WAN) or the Internet. In some embodiments, the network 140 can be comprised of one or more wired and/or wirelessly connected hardware devices. As shown in FIG. 1, the network 140 can operatively couple and/or connect or more of the mobile devices 110, 120 and 130 to any of the enterprise application server 150, the management server 160 and the cloud application server 170.

The enterprise application server 150 can be any combination of hardware and/or software (executing in hardware) configured to execute one or more enterprise applications, such as the enterprise applications 152 and 154. For example, the enterprise application server 150 can be a server device configured to execute an accounting system, corporate e-mail server application, and/or other application configured to provide functionality to one or more client devices associated with an organization (e.g., one or more of the mobile devices 110, 120 and 130). In some embodiments, the enterprise application server 150 can be operatively and/or physically coupled to the network 140 via, for example, a wired and/or wireless connection, via, for example one or more line cards, wired and/or wireless Ethernet cards, etc. Although not shown in FIG. 1, the enterprise application 152 and/or the enterprise application 154 can be configured to send one or more signals to the management server 160 via the network 140. For example, the enterprise application 152 can send one or more signals including information associated with performance of the enterprise application 152 and/or one or more alerts, events or errors associated therewith.

The management server 160 can be any combination of hardware and/or software (executing in hardware) configured to execute one or more management applications associated with the mobile devices 110, 120 and 130 and/or one or more apps executing thereon. As shown in FIG. 1, the management server 160 includes the analytics module 162 and the reporting module 164. In some embodiments, the management server 160 can be a server device operatively and/or physically coupled to the mobile devices 110, 120 and 130 via the network 140. The management server 160 can optionally, via the analytics module 162, perform one or more operations, calculations and/or determinations associated with the mobile devices 110, 120 and 130 and/or the mobile apps executing thereon (e.g., the mobile apps 111-113, 121-123 and 131-133). For example, the analytics module 162 can perform the one or more operations, calculations and/or determinations on and/or with the performance, error, anomaly, event and/or feature information received from one or more of the expert processes 115, 125, 135 (as described above). In another example, the reporting module 164 can be configured to output information associated with the mobile devices 110, 120 and 130, the expert processes 115, 125 and 135 and/or the mobile apps 111-113, 121-123 and 131-133. More specifically, the reporting module 164 can output, at a display, results from one or more operations performed by the analytics module 162. Alternatively, the reporting module 164 can send one or more signals to another device for output threat. In some embodiments, the management server 160 can include one or more modules configured to perform an error correction task associated with a mobile app executing at a mobile device (not shown in FIG. 1).

The cloud application server 170 can be any combination of hardware and/or software configured to execute one or more cloud-based applications, such as the cloud application 172 and the cloud application 174. As shown in FIG. 1, the cloud application server 170 can be operatively and/or physically coupled to the network 140 via a wired and/or wireless link. As also shown in FIG. 1, the cloud application 172 and/or the cloud application 174 can communicate with any of the mobile devices 110, 120 and 130 via the network 140. In some embodiments, the cloud application 172 and the cloud application 174 can be any cloud-based software application, such as a cloud-based e-mail application, a cloud-based word processing application, a cloud-based storage application, etc. Although not shown in FIG. 1, the cloud application 172 and the cloud application 174 can be configured to send one or more signals to the management server 160 via the network 140. For example, the cloud application 172 can send one or more signals including information associated with performance of the cloud application 172 and/or one or more alerts, events or errors associated therewith.

Figure 2:
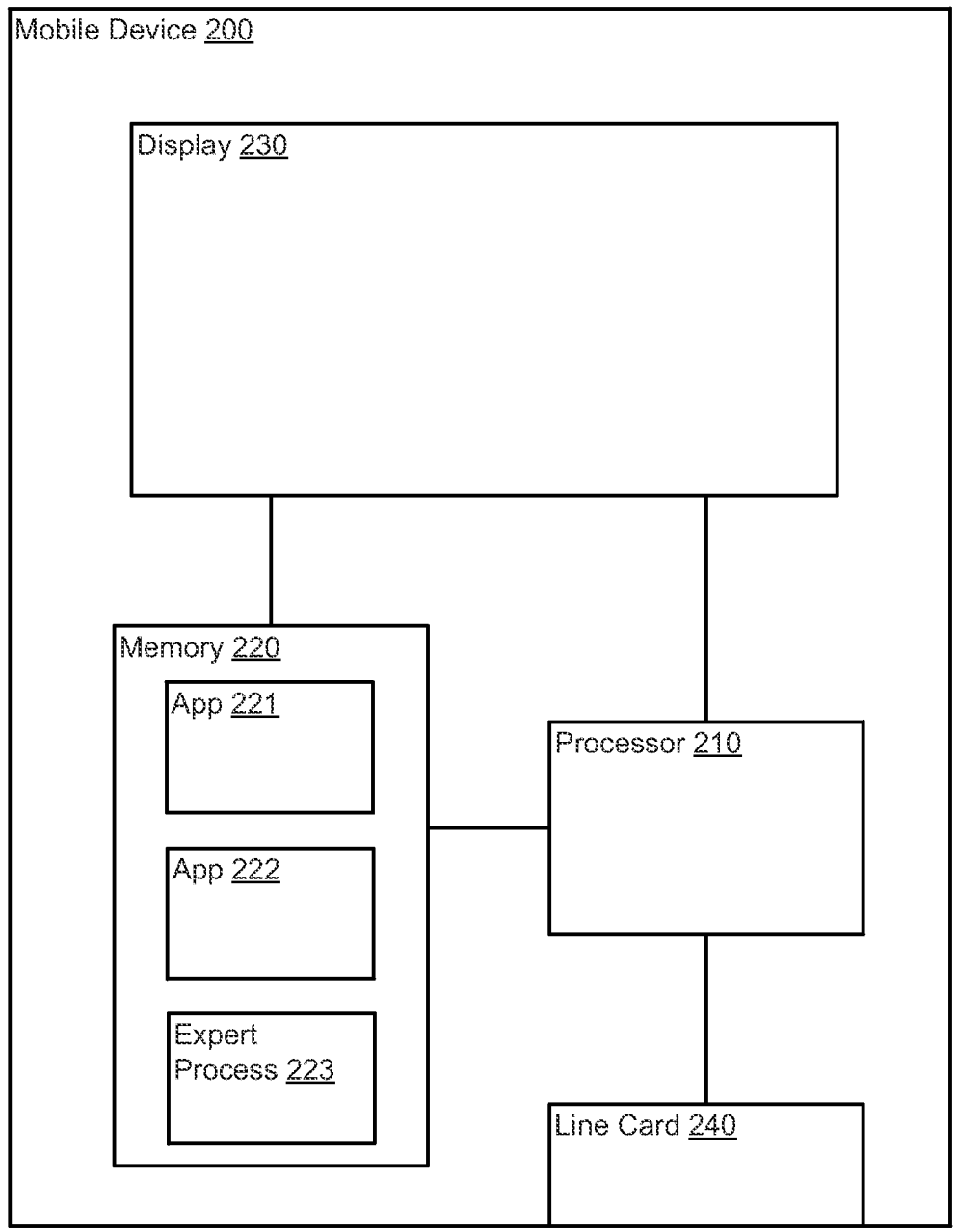
FIG. 2 is a schematic diagram that illustrates a mobile device executing multiple mobile applications and an expert process, according to another embodiment.

FIG. 2 is a schematic diagram that illustrates a mobile device executing multiple mobile applications and an expert process, according to another embodiment. More specifically, FIG. 2 is a system block diagram of a mobile device 200, similar to the mobile devices 110, 120 and 130 described in connection with FIG. 1 above. The mobile device 200 includes a processor 210 operatively coupled to a memory 220, to a display 230 and to a line card 240. As shown in FIG. 2, the memory 220 includes two mobile applications ("mobile apps") 221 and 222, and an expert process 223. In some embodiments, the mobile device 200 can include additional hardware modules and/or software modules (executing in hardware) not shown in FIG. 2. For example, the mobile device 200 can include one or more input devices and/or peripherals, one or more data input ports, etc.

The processor 210 can be any processor (e.g., a central processing unit (CPU), an application-specific integrated circuit (ASIC), or a field programmable gate array (FPGA)) configured to execute one or more instructions received from, for example, the memory 220. In some embodiments, the processor 210 can be a mobile device microprocessor specifically designed to execute on or within a mobile device. As shown in FIG. 2, the processor 210 can be in communication with any of the memory 220, the display 230 and the line card 240. In some embodiments, the processor 210 can accordingly send information (e.g., data, instructions and/or network data packets) to and/or receive information from any of the memory 220, the display 230 and the line card 240.

The memory 220 can be any memory (e.g., a RAM, a ROM, a hard disk drive, an optical drive, other removable media) configured to store information (e.g., a mobile operating system, one or more apps, one or more expert processes, media content, text content, contact information, etc.). As shown in FIG. 2, the memory 220 can include a mobile app 221, a mobile app 222 and an expert process 223. In some embodiments, the memory 220 can include instructions (e.g., code) sufficient to define and/or execute the mobile app 221, the mobile app 222 and the expert process 223. Each of the mobile apps 221 and 222 can optionally be similar to any of the mobile apps 111-113, 121-123 and 131-133 discussed in connection with FIG. 1 above. The expert process 223 can optionally be similar to any of the expert processes 115, 125 and 135 also discussed in connection with FIG. 1 above. In some embodiments, any of the mobile apps 221-222 and/or the expert process 223 can be stored at the memory 220 at a time of purchase of the mobile device 200. Alternatively, any of the mobile apps 221-222 and/or the expert process 223 can be stored at the memory 220 in response to a download initiated by a user of the mobile device 200 (e.g., a download from an online marketplace such as an app store, a download performed in response to an instruction from an enterprise server to which the mobile device is connected, etc.).

The memory 220 can also alternatively store one or more resources (e.g., software resources such as drivers, code libraries, etc.) associated with the mobile app 221, the mobile app 222 and the expert process 223. In some embodiments, the memory 220 can further store mobile app performance information received and/or calculated by the expert process 223, such as mobile app performance, error, alert, event and/or other reporting information.

The display 230 can be any display configured to display information to a user of the mobile device 200. For example, the display 230 can be a liquid crystal display (LCD), a light-emitting diode (LED) display, an organic light-emitting diode (OLED) display, a touchscreen, a tactile display, or other screen or display type. As shown in FIG. 2, the display 230 can receive information from the memory 220 and/or the processor 210. Although not shown in FIG. 2, in some embodiments the display 230 can receive information from the processor 210 and/or the memory 220 via one or more intermediary modules, such as one or more embedded hardware modules (e.g., a video hardware module). In some embodiments, the display 230 can display information associated with one or more of the apps 221 and 222.

The line card 240 can be a hardware module (e.g., a wired and/or wireless Ethernet card, a cellular network interface card) configured to transmit information (e.g., data packets, cells, etc.) from and receive information at the mobile device 200. As shown in FIG. 2, the line card 240 can be operatively and/or physically coupled to the processor 210. In this manner, the processor 210 can, via the line card 240, exchange information with one or more other devices via a network (e.g. the cloud application server 160 and the network 140 discussed in connection with FIG. 1 above).

Figure 3:
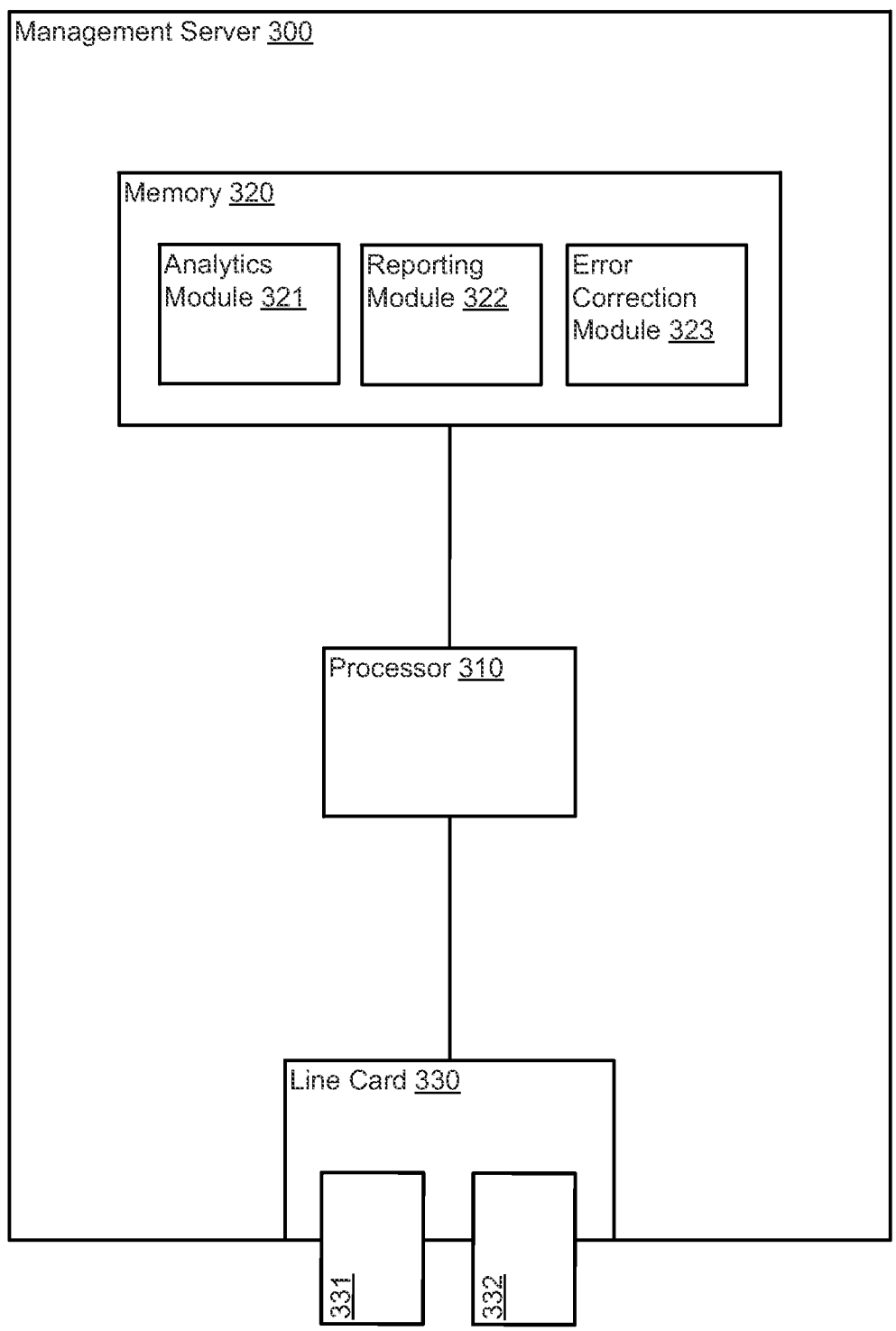
FIG. 3 is a schematic diagram that illustrates a management server of a mobile application reporting system, according to another embodiment.

FIG. 3 is a schematic diagram that illustrates a management server of a mobile application reporting system, according to another embodiment. More specifically, FIG. 3 is a system block diagram of a management server 300, similar to the management server 160 described in connection with FIG. 1 above. The management server 300 includes a processor 310 operatively coupled to a memory 320 and to a line card 330. As shown in FIG. 3, the memory 320 includes an analytics module 321, a reporting module 322 and an error correction module 323. In some embodiments, the management server 300 can include additional hardware modules and/or software modules (executing in hardware) not shown in FIG. 3. For example, the management server 300 can include one or more input devices and/or peripherals, one or more data input ports, etc.

The processor 310 can be any processor (e.g., a central processing unit (CPU), an application-specific integrated circuit (ASIC), or a field programmable gate array (FPGA)) configured to execute one or more instructions received from, for example, the memory 320. As shown in FIG. 3, the processor 310 can be in communication with any of the memory 320 and the line card 330. In some embodiments, the processor 310 can accordingly send information (e.g., data, instructions and/or network data packets) to and/or receive information from any of the memory 320 and the line card 330.

The memory 320 can be any memory (e.g., a RAM, a ROM, a hard disk drive, an optical drive, other removable media) configured to store information (e.g., a server operating system, a desktop operating system, one or software applications, etc.). As shown in FIG. 3, the memory 320 can include an analytics module 321, a reporting module 322 and an error correction module 323. In some embodiments, the memory 320 can include instructions (e.g., code) sufficient to define and/or execute the analytics module 321, the reporting module 322 and the error correction module 323. The memory 320 can also alternatively store one or more resources (e.g., software resources such as drivers, code libraries, etc.) associated with the analytics module 321, the reporting module 322 and the error correction module 323. In some embodiments, the memory 320 can further store mobile app performance information received from one or more mobile devices, mobile app performance metrics calculated based thereon, etc.

As described in connection with the analytics module 162 of FIG. 1, the analytics module 321 can optionally be a software module configured to perform one or more operations on information associated with one or more mobile apps. For example, the analytics module 321 can perform one or more performance calculations associated with one or more mobile apps, such as average performance speed, average number of errors, total number of errors, average crash rate, total number of crashes, average startup time, average uptime, processor usage rates, network connectivity status, network connectivity history, etc. In some embodiments, the analytics module 321 can perform the above-described calculations and/or one or more other calculations for multiple instances of the same mobile app stored, instantiated and/or executing at multiple mobile devices. In this manner, the analytics module 321 can determine and/or display to a user a performance level for a given mobile app, for a given group of mobile apps, etc. Additionally, the analytics module 321 can optionally determine any of the above-described metrics for a given period of time (e.g., a user-specified period of time, a predetermined interval of time, etc.).

As described in connection with the reporting module 164 of FIG. 1, the reporting module 322 can optionally be a software module configured to define and/or output (e.g., display at a visual display or other output device) mobile app performance information associated with one or more mobile apps instantiated at one or more mobile devices. More specifically, the reporting module 322 can define one or more reports (e.g., periodic reports, on-demand reports, event-driven reports) including analytics and/or other performance information calculated by the analytics module 321. For example, the reporting module 322 can receive performance information associated with a given mobile app instantiated and/or executing at multiple mobile devices, and define a report indicating one or more performance metrics associated therewith. In the example, the reporting module 322 can next send the report for output at a display (e.g., a display of a client device operatively coupled to the management server 300). In some embodiments, the reporting module 322 can optionally store the report at a memory for later access and/or retrieval, such as a database or other memory operatively coupled to the management server 300 (not shown in FIG. 3). In this manner, the reporting module 322 can store mobile app performance information for subsequent access and/or use in determining long-term analytics, performance analytics and the like for a given mobile app, set of mobile apps, etc.

The error correction module 323 can be any combination of hardware and/or software (e.g., a software module) configured to receive, from a mobile device, an indication of an error, alert and/or anomaly, and accordingly perform one or more operations configured to remedy the indicated issue. For example, the error correction module 323 can receive, from a mobile device operatively coupled to the management server 300 (not shown in FIG. 3), a signal including an indication that the mobile device has an amount of available memory below a predetermined threshold, that the mobile device has an amount of remaining battery power below a predetermined threshold, and/or that the mobile device is currently unable to connect to a specified network and/or network resource.

In some embodiments, the error correction module 323 can, in response to the received signal, perform one or more actions. For example, the error correction module 323 can optionally send a response signal to the mobile device that includes a response message for review by a user of the mobile device. The response message can be a text, audio and/or video message, and can include one or more instructions configured to enable the user to remedy the error or other issue indicated by the original error signal. For example, if the original error signal includes an indication that the mobile device is low on battery power, the response message can include an instruction to disable one or more unneeded mobile device services (e.g., Wi-Fi connectivity, Bluetooth connectivity, etc.), to reduce screen brightness, close one or more unused or infrequently-used mobile apps, etc. Alternatively, if the original error signal includes an indication that the amount of available memory currently available on the mobile device is below a predetermined threshold, the response message can include an instruction to clear one or more caches of the device, use an external memory (e.g., a flash memory device) to supplement the mobile device memory, close and/or delete one or more mobile apps stored at the mobile device, etc.

In some embodiments, the error correction module 323 can, in response to the received signal, send a response signal including an instruction configured to cause the mobile device to automatically perform one or more of the actions described above. In this manner, the error correction module 323 can receive indication of an error or other issue at a mobile device and automatically remedy the error without user intervention or assistance.

The line card 330 can be a hardware module (e.g., a wired and/or wireless Ethernet card, a cellular network interface card) configured to transmit information (e.g., data packets, cells, etc.) from and receive information at the management server 300. As shown in FIG. 3, the line card 330 can include ports 331 and 332, and can be operatively and/or physically coupled to the processor 310. In this manner, the processor 310 can, via the line card 330, exchange information with one or more other devices via a network (e.g., a mobile device, a cloud application server, an enterprise application server, etc.).

Figure 4:
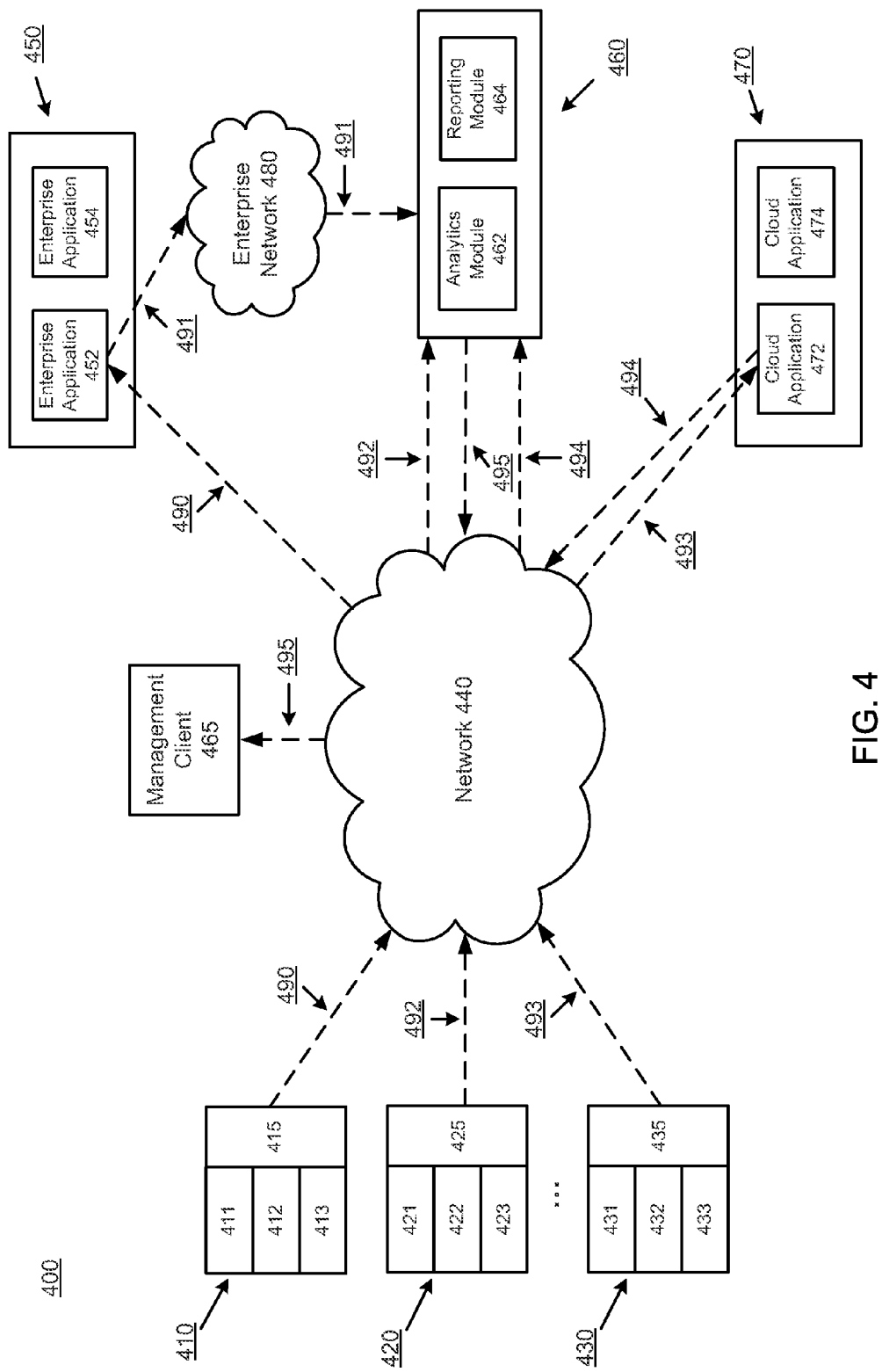
FIG. 4 is a schematic diagram that illustrates a mobile application performance management system, according to an embodiment.

FIG. 4 is a schematic diagram that illustrates a mobile application performance management system, according to an embodiment. More specifically, FIG. 4 illustrates mobile devices 410, 420 and 430 operatively coupled to enterprise application server 450, management server 460 and cloud application server 470, via a network 440. The enterprise application server 450 is operatively coupled to the management server 460 via an enterprise network 480. The management server 460 is also operatively coupled to a management client 465 via the network 440. As shown in FIG. 4, each of the mobile devices 410, 420 and 430 includes multiple mobile apps and an expert process. More specifically, the mobile device 410 includes the mobile apps 411-413 and the expert process 415, the mobile device 420 includes the mobile apps 421-423 and the expert process 425, and the mobile device 430 includes the mobile apps 431-433 and the expert process 435. As also shown in FIG. 4, the enterprise server 450 includes enterprise applications 452 and 454, the management server 460 includes analytics module 462 and reporting module 464, and the cloud application server 470 includes the cloud application 472 and the cloud application 474.

The mobile devices 410, 420 and 430 can be similar to the mobile devices 110, 120 and 130 described in connection with FIG. 1 above. In some embodiments, any of the mobile devices 410, 420 and 430 can be a cellular telephone (e.g., a smart phone), a tablet computing device, or other mobile computing device. Each of the mobile apps 411-413, 421-423 and 431-433 can be similar to the mobile apps 111-113, 121-123 and 131-133 of FIG. 1. Each of the enterprise application server 450, the enterprise application 452 and the enterprise application 454 can be similar to the enterprise application server 150, the enterprise application 152 and the enterprise application 154, respectively, of FIG. 1. Each of the management server 460, the analytics module 462 and the reporting module 464 can be similar to the management server 160, the analytics module 162 and the reporting module 164, respectively, of FIG. 1. In some embodiments, the management server 460 can be included in and/or in communication with an enterprise network (e.g., the enterprise network 480), and can accordingly be managed by one or more members of the enterprise. Alternatively, the management server 460 can be managed by a centralized entity configured to administer the analytics module 462 and/or the reporting module 464 on behalf of one or more external entities (and thus one or more mobile devices associated with those entities). Each of the cloud application server 470, the cloud application 472 and the cloud application 474 can be similar to the cloud application server 170, the cloud application 172 and the cloud application 174, respectively, of FIG. 1. In some embodiments, the network 440 can be similar to the network 140 described in connection with FIG. 1 above.

The management client 465 can be any valid combination of hardware and/or software (e.g., a client hardware device executing software) configured to allow an administrator of the mobile application performance management system to exchange information with the management server 460. For example, the management client 465 can be a personal or server computing device, such as a desktop, laptop, notebook, netbook or tablet computer. Alternatively, the management client can be a mobile device, such as a cellular telephone, smart phone, personal digital assistant (PDA), etc. As shown in FIG. 4, the management client 465 can communicate with the management server via the network 440. Alternatively, in some embodiments, the management server 465 can be positioned and/or configured to communicate directly with the management server 460, and/or to communicate with the management server 460 via the enterprise network 480.

The enterprise network 480 can be any computer or information network owned and/or operated by, or on behalf of, a given organization. Similar to the network 440, the enterprise network 480 can be capable of marshalling and transmitting data between two or more hardware devices. For example, the enterprise network 480 can be a local area network (LAN), a wide area network (WAN), or a virtual private network (VPN) operating over a public network, such as the Internet. In some embodiments, the enterprise network 480 can be comprised of one or more wired and/or wirelessly connected hardware devices. As shown in FIG. 4, the enterprise network 480 can operatively couple and/or connect the enterprise server 450 (including, e.g., one or more of the enterprise applications 452 and 454) and the management server 460 (including, e.g., one or more of the analytics module 462 and the reporting module 464). Although not shown in FIG. 4, in some embodiments the enterprise network 480 can exchange signals and/or data between one or more of the mobile devices 410, 420 and 430 and the enterprise server 450 and/or the management server 460. In this manner, the management server 460 can provide connectivity between one or more client-side enterprise mobile apps (executing at one or more of the mobile devices 410, 420 and 430), one or more of the enterprise applications 452 and 454, and one or more of the analytics module 462 and the reporting module 464.

As shown in FIG. 4, the expert process 415 (hosted at the mobile device 410) can send a signal 490 to the enterprise application 452 via the network 440. In some embodiments, the expert process 415 can send the signal 490 to the enterprise application 452 via the enterprise network 480. The signal 490 can include, for example, performance and/or analytics information associated with one or more client-side enterprise mobile apps instantiated at the mobile device 410 (e.g., one or more of the mobile apps 411-413). Alternatively, the signal 490 can include a typical data packet sent as part of the execution of an mobile enterprise app. For example, the signal 490 can include a portion of an enterprise e-mail message for processing by the enterprise application 452.

Upon receipt of the signal 490 from the mobile device 410 via the network 440, the enterprise application 452 can perform one or more operations thereon and/or in response thereto. For example, the enterprise application 452 can send a response signal (not shown in FIG. 4) to the mobile device 410. Alternatively, the enterprise application 452 can perform one or more analytics operations using, at least in part, mobile enterprise app performance information included in the signal 490. For example, the enterprise application 452 can use the mobile enterprise app performance information included in the signal 490 along with other mobile enterprise app performance information associated with other instances of the same mobile enterprise app to determine aggregate and/or average performance metrics for that mobile enterprise app.

Having defined the above-described performance metrics, the enterprise application 452 can send a signal 491 to the management server 460 via the enterprise network 480. The signal 491 can optionally include the performance metrics defined by the enterprise application 452 and/or other information associated therewith. In this manner, the enterprise application 452 can aggregate and/or calculate performance and/or other analytic information associated with an enterprise mobile app to be stored and/or used by the analytics module 462 in performing additional analytic operations. Said differently, the enterprise application 452 (executing at the enterprise application server 450) can, in conjunction with the expert process 415 (executing at the mobile device 410), compile, define and/or report enterprise mobile app performance, error, anomaly and/or event information to the analytics module 462 (executing at the management server 460).

As also shown in FIG. 4, the expert process 425 (instantiated at the mobile device 420) can send a signal 492 to the analytics module 462 (executing at the management server 460) via the network 440. The signal 492 can optionally include performance, error, anomaly, alert, event and/or other information associated with one or more of the mobile apps 421-423 executing at the mobile device 420. In some embodiments, the signal 492 can be sent according to a predefined schedule, such as a periodic reporting schedule defined to provide the analytics module 462 with periodic performance information from the mobile device 420. Alternatively, the signal 492 can be sent in response to the occurrence of a given event at the mobile device 420, such as an error occurring within the mobile app 422. Alternatively, the signal 492 can be sent in response to a request from the analytics module 462. This request can optionally be sent according to a predetermined schedule or in response to a user-directed command received from the management client 465.

Upon receipt of the signal 492, the analytics module 462 can perform one or more additional analytics operations thereon. For example, the analytics module 462 can use performance information included in the signal 492 to define and/or calculate one or more performance metrics for the mobile device 420. Alternatively or additionally, the analytics module 462 can use performance information associated with, for example, the mobile app 423, to calculate one or more average or aggregate performance metrics for multiple instances of the mobile app 423 (e.g., other instances of the mobile app 423 executing at one or more other mobile devices (not shown in FIG. 4)).

As further shown in FIG. 4, the expert process 435 (instantiated at the mobile device 430) can send a signal 493 to the cloud application 472 (instantiated at the cloud application server 470) via the network 440. The signal 493 can include, for example, mobile app performance information associated with one or more of the mobile apps 431-433 executing at the mobile device 430. In some embodiments, prior to sending the signal 493, the expert process 435 can aggregate and/or perform one or more operations or calculations on mobile app performance information received from one or more of the mobile apps 431-433. In such embodiments, the signal 493 can include, at least in part, results of the one or more operations.

Alternatively, the signal 493 can include typical application communication between one of the mobile apps 431-433 and the cloud application 472. For example, the mobile app 433 can be a cloud-based application mobile client, such as a mobile e-mail client app. In the example, the signal 493 can include a request to receive, from the cloud application 472, any new e-mail messages associated with an e-mail account of a user of the mobile device 430.

Upon receipt of the signal 493 from the mobile device 430 via the network 440, the cloud application 472 can perform one or more operations thereon and/or in response thereto. For example, the cloud application 472 can send a response signal (not shown in FIG. 4) to the mobile device 430 including, for example, the requested e-mail or other information. Alternatively, the cloud application 472 can perform one or more analytics operations using, at least in part, mobile app performance information included in the signal 493. For example, the cloud application 472 can use the mobile app performance information included in the signal 493 along with other mobile app performance information associated with other instances of the same mobile enterprise app to determine aggregate and/or average performance metrics for that mobile app.

Having defined the above-described performance metrics, the cloud application 472 can send a signal 494 to the management server 460 via the network 440. The signal 494 can optionally include the performance metrics defined by the cloud application 472 and/or other information associated therewith. In this manner, the cloud application 472 can aggregate and/or calculate performance and/or other analytic information associated with an enterprise mobile app to be stored and/or used by the analytics module 462 in performing additional analytic operations. Said differently, the cloud application 472 (executing at the cloud application server 470) can, in conjunction with the expert process 435 (executing at the mobile device 430), compile, define and/or report enterprise mobile app performance, error, anomaly and/or event information to the analytics module 462 (executing at the management server 460).

As also shown in FIG. 4, the management server 460 can send a signal 495 to the management client 465 via the network 440. In some embodiments, the signal 495 can include performance metric information associated with one or more of the mobile devices 410, 420 and 430 and/or the mobile apps 411-413, 421-423 and 431-433. The signal 495 can also optionally include additional performance, error, anomaly, event, alert and/or other information associated with one or more mobile devices and/or mobile apps as calculated by the analytics module 462. In some embodiments, the reporting module 464 can send the signal 495 in response to one or more request signals received from the management client 465 (not shown in FIG. 4). The one or more request signals can optionally be sent in response to user input received at the management client 465. Alternatively, the one or more request signals can be sent by the management client 465 according to a predetermined schedule.

Upon receipt of the signal 495, the management client 465 can output, at a display, the mobile app performance information described above. For example, the management client 465 can output, at a monitor, projector, or other visual output device, one or more charts, graphs, tables, videos, or other graphics describing the mobile app performance information. Alternatively or additionally, the management client 465 can send the mobile app performance information included in the signal 495 to a memory, such as an internal or external database, for storage and/or subsequent display.

Figure 5:
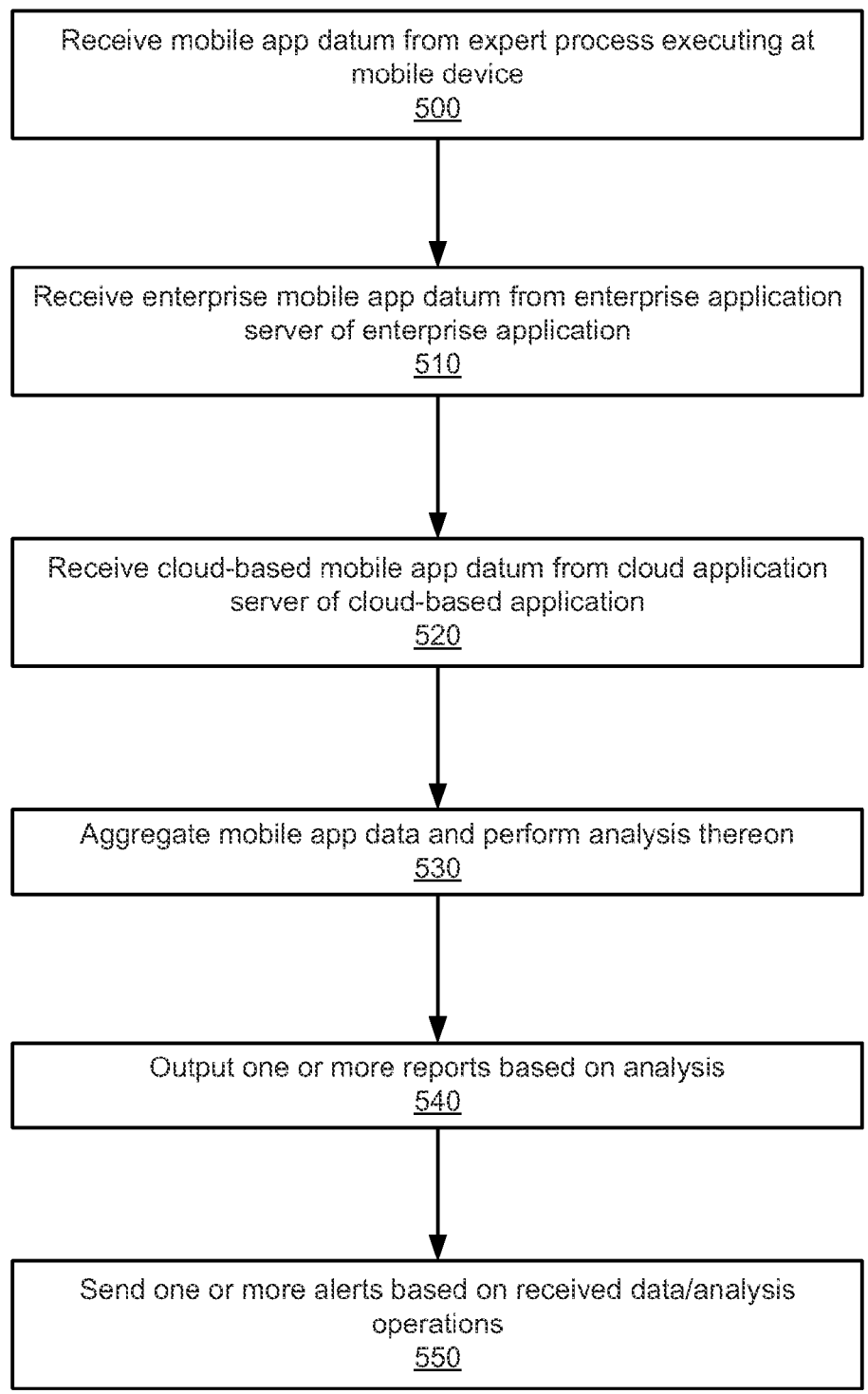
FIG. 5 is a flow chart that illustrates a method of receiving and analyzing mobile application performance and/or error information, and taking one or more actions in response to the same, according to another embodiment.

FIG. 5 is a flow chart that illustrates a method of receiving and analyzing mobile application performance and/or error information, and taking one or more actions in response to the same, according to another embodiment. As described in FIG. 5, a datum associated with a mobile computing application ("mobile app") can be received from an expert process executing at a mobile device, 500. The mobile app datum can be performance, user/system setting, alert, event, error, or other information associated with a mobile app executing at the mobile device. For example, the mobile app datum can indicate performance speed of the mobile app, quantity of system resources occupied/utilized by the mobile app at a given moment in time, one or more errors, alerts and/or other events occurring within the mobile app, network connectivity of the mobile app, etc.

The expert process can be any combination of hardware and/or software (executing in hardware) configured to receive, process and/or transmit mobile application information, such as the mobile app datum described above. In some embodiments, the expert process can be a running software module (i.e., a process) executing at the mobile device. The expert process can be loaded onto/stored at the mobile device via a network download (via, e.g., an organization intranet or the Internet), pre-sale installation process, etc. The expert process can be configured to run resident in a memory of the mobile device, and to receive information periodically from one or more mobile apps also running resident in the memory of the mobile device. Alternatively, the expert process can receive the above-described information from one or more mobile apps on an event-driven basis, i.e., when a given event (e.g., an application error, alert, etc.) occurs within a currently-executing mobile app. In some embodiments, the expert process can alternatively be embedded within a mobile application. In such embodiments, the embedded expert process can send information associated with the mobile application in which it is embedded to another expert process operating at the mobile device and/or directly to a server, such as a management server, cloud server and/or enterprise server.

In some embodiments, one or more mobile apps executing at the mobile device can be designed to communicate with the expert process according to a predefined API. In such embodiments, the mobile apps can optionally be designed, configured and or coded to utilize a predefined Software Development Kit (SDK) designed to enable communication between a mobile app and an expert process. The one or more mobile apps can be any application capable of executing at a mobile device, such as a productivity, communication, entertainment, or other mobile application type. The mobile device can optionally be similar to any of the mobile devices 110, 120 and 130 described in connection with FIG. 1 above. As such, the mobile device can be a cellular telephone, smartphone, tablet computing device, etc.

The mobile app datum can be included in a signal received at a mobile application management server. More specifically, the mobile app datum can be received from the expert process, via a network, at a server and/or other computing device configured to receive performance data associated with one or more mobile apps instantiated and/or executing at one or more mobile devices. In some embodiments, the mobile application management server can be associated with and/or administered by a single organization. Alternatively, the mobile application management server can be administered by a hosting entity, and can receive mobile application performance data associated with one or more mobile devices associated with one or more entities.

An enterprise mobile app datum can be received from an enterprise application server of an enterprise application, 510. More specifically, the management server described in connection with step 500 above can receive, via a network, a mobile application performance datum of an enterprise application (e.g., an enterprise e-mail application, document management application, productivity application, etc.). The mobile application performance datum of the enterprise application can include, for example, one or more errors, alerts and/or other events occurring within the enterprise application and/or mobile enterprise app. In some embodiments, the enterprise mobile app datum can be received via an enterprise network to which the mobile device is connected and/or an external network, such as the Internet. The enterprise mobile app datum can be received from an enterprise application server hosting one or more server-side hardware and/or software modules. In this manner, the management server can receive individual and/or aggregate performance metrics and/or statistics defined, calculated and/or produced by the enterprise application server for one or more instances of the enterprise application.

A cloud-based mobile app datum can be received from a cloud application server of a cloud-based application, 520. More specifically, the management server described in connection with step 500 above can receive, via a network, mobile application performance data of a cloud-based application (e.g., a cloud-based e-mail application, document management application, productivity application, etc.). The mobile application performance datum of the cloud-based application can include, for example, one or more errors, alerts and/or other events occurring within the cloud-based application and/or mobile cloud-based app. In some embodiments, the cloud-based mobile app datum can be received via a network to which the mobile device is connected, such as a local area network (LAN), wide area network (WAN), an organization intranet and/or the Internet. The cloud-based mobile app datum can be received from a cloud application server hosting one or more server-side hardware and/or software modules. In this manner, the management server can receive individual and/or aggregate performance metrics and/or statistics defined, calculated and/or produced by the cloud application server for one or more instances of the cloud-based application.

The management server can aggregate the received mobile app data and perform analysis thereon, 530. More specifically, the management server can perform one or more operations configured to determine aggregate, average, periodic and/or other mobile app performance information. For example, the management server can determine one or more performance metrics for all instances of all mobile apps running at a given mobile device or set of mobile devices, for all instances of a specific mobile app running at multiple mobile devices, for a single instance of a given enterprise mobile app executing at a single mobile device, for a single instance of a given cloud-based mobile app executing at a single mobile device, etc. In some embodiments, the management server can store the calculated performance metrics at a memory, such as a local hard drive, volatile or non-volatile memory, an external database, etc.

The management server can output one or more reports based on the above-described analysis operations, 540. For example, the management server can output, at a display, one or more charts, graphs, graphics, illustrations, tables, or other visual or audio representations that indicate the calculated performance metrics. In some embodiments, the management server can output the performance metric information via an application executing at the management server, such as a web browser, a productivity or presentation application, a multimedia application, a television application, etc. As discussed in connection with FIG. 4 above, the management server can optionally send at least a portion of the calculated performance metrics to a client device, via a network, such that the calculated performance metric information is output at the client device (e.g., the management client 465 described in connection with FIG. 4 above).

The management server can send one or more alerts based on the received data and/or analysis operations, 550. More specifically, upon receipt of a mobile app datum (e.g., an error or alert) and/or upon determination of a specified trend (e.g., a performance metric below a predetermined threshold), the management server can define and send one or more alerts to one or more devices. For example, the management server can send, via a local or private network (e.g., the Internet, an organization intranet, an organization enterprise network), one or more signals indicating the error, alert, or other event. In this manner, the management server can send notification to one or more concerned individuals, thereby allowing the individuals to take any appropriate responsive action.

Although not shown in FIG. 5, in some embodiments the management server can next send at least a portion of the received mobile app data, one or more of the generated reports and/or one or more of the above-described alerts to a management client. The management client can be, for example, a client device and/or software module similar to the management client 465 described in connection with FIG. 4 above. In this manner, the management server can provide information enabling a user of the management server to take responsive action (e.g., corrective action) based at least in part on the received information.

In some embodiments, the management server can take one or more predefined corrective actions based at least in part on the above-described received data and/or analysis operations. For example, as described in connection with FIG. 3 above, the management server can send, to the mobile device, one or more signals, alerts and/or messages configured to change one or more settings or functions of the mobile device and/or instruct a user of the mobile device to do so.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files that contain higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. In some embodiments, a processor-readable medium can comprise code representing instructions that when executed cause a processor to receive, at a mobile device, a first performance datum defined by an application installed on the mobile device. The code can further cause the processor to define a performance report, the performance report being associated with the application and being based at least in part on a correlation between the first performance datum and at least one of: at least one status datum associated with one or more components of the mobile device; at least one environment variable value defined by an operating system installed on the mobile device; status information associated with a communication network to which the mobile device is currently connected; and a second performance datum defined by the application. The code can further cause the processor to send the performance report.

A processor-readable medium can comprise code representing instructions that when executed cause a processor to receive a first performance report from a mobile device, the first performance report including information associated with at least one performance characteristic of a mobile application installed on the mobile device. The code can further cause the processor to receive a second performance report from a server device, the second performance report including information associated with at least one performance characteristic of a cloud-based device application. The code can further cause the processor to output a performance anomaly report, the performance anomaly report being based at least in part on at least one of: a portion of the first performance report; and a portion of the second performance report.

What is claimed is:

1. A non-transitory processor-readable medium storing code representing instructions that when executed cause a processor to:

receive, at a process running on a mobile device, via an application programming interface (API) provided by the process, first mobile application performance data associated with a first mobile application running on the mobile device, wherein the API is configured to enable data communication between the process and the first mobile application;

receive, at the process, via the API, second mobile application performance data associated with a second mobile application running on the mobile device, the second mobile application being different from the first mobile application, wherein the API is further configured to enable data communication between the process and the second mobile application;

calculate, at the process, a performance metric based at least in part on the first mobile application performance data and the second mobile application performance data; and send the performance metric from the mobile device to a server, wherein the first mobile application and the second mobile application comprise code associated with a software development toolkit configured to enable communication with the process using the API.

2. The non-transitory processor-readable medium of claim 1, wherein the first mobile application performance data includes information associated with at least one of:
availability of the first mobile application;
performance speed of the first mobile application;
feature usage associated with the first mobile application;
debug information associated with the first mobile application;
advertisement information associated with the first mobile application;
business metrics associated with the first mobile application;
one or more errors associated with the first mobile application; and
network connectivity of the first mobile application.

3. The non-transitory processor-readable medium of claim 1, wherein the first mobile application performance data is sent by the first application according to a predetermined schedule.

4. The non-transitory processor-readable medium of claim 1, wherein the first mobile application performance data is sent by the first application in response to an error associated with the first mobile application.

5. The non-transitory processor-readable medium of claim 1, wherein the performance metric is based at least in part on a correlation between the first mobile application performance data and the second mobile application performance data.

6. The non-transitory processor-readable medium of claim 1, wherein the code further represents instructions that when executed cause the processor to:
generate a performance report associated with the first application, wherein the performance report is based at least in part on a correlation between the first mobile application performance data and at least one of: a status datum associated with one or more components of the mobile device; an environmental datum defined by an operating system installed on the mobile device; a status datum associated with a communication network to which the mobile device is connected; or a third performance datum associated with the first application; and
send the performance report from the mobile device to a server.

7. A non-transitory processor-readable medium storing code representing instructions that when executed cause a processor to:
receive, from a process running on a first mobile device, via an application programming interface (API) provided by the process, first mobile application performance data associated with of a first mobile application running on the first mobile device, wherein the API is configured to enable receipt of the first mobile application performance data;
receive, from the process running on the first mobile device, via an API, second mobile application performance data associated with a second mobile application running on the first mobile device, the second mobile application being different from the first mobile application, wherein the API is further configured to enable receipt of the second mobile application performance data; and
calculate a performance metric based at least in part on the first mobile application performance data and the second mobile application performance data,
wherein the first mobile application and the second mobile application comprise code associated with a software development toolkit configured to enable communication with the process using the API.

8. The non-transitory processor-readable medium of claim 7, wherein the code further represents instructions configured to cause the processor to: send the performance metric to the first mobile device.

9. The non-transitory processor-readable medium of claim 7, wherein the code further represents instructions that when executed cause the processor to:
receive mobile device data from the first mobile device, wherein the mobile device data relates to at least one of:
a configuration change associated with the first mobile application;
a configuration setting associated with the first mobile application;
a configuration change associated with the mobile device;
a configuration setting associated with the mobile device;
an available storage space of the mobile device;
identifier data associated with the mobile device;
power usage data associated with the mobile device;
network connectivity data associate with the mobile device; and
network performance data associated with the mobile device.

10. The non-transitory processor-readable medium of claim 7, wherein the code further represents instructions that when executed cause the processor to:
define a baseline normal mobile application performance level for the first mobile application;
calculate a mobile application performance level for the first mobile application; and
send a signal to the first mobile device, wherein the signal is configured to cause the first mobile device to display the baseline normal application performance level for the first mobile application and the mobile application performance level for the first mobile application.

11. The non-transitory processor-readable medium of claim 7, wherein the code further represents instructions that when executed cause the processor to:
receive, from a cloud application, cloud application performance data associated with a first cloud application accessed by the mobile device; and calculate a cloud application performance metric based at least in part on the third cloud application performance data.

12. The non-transitory processor-readable medium of claim 7, wherein the code further represents instructions that when executed cause the processor to:
receive an alert based at least in part on an error associated with the first mobile application; and
send a signal to the first mobile device,
wherein the signal is configured to cause the first mobile device do one or more of:
change a system setting;
change a user setting; or
change an application setting.

13. The non-transitory processor-readable medium of claim 7, wherein the code further represents instructions that when executed cause the processor to:
receive, from a second mobile device, third mobile application performance data associated with the first mobile application running on the second mobile device; and
calculate application performance data associated with the first mobile application based at least in part on the first mobile application performance data and the third mobile application performance data.

14. A method for collecting application performance data, the method comprising:
receiving, at a process running on a mobile device, via an application programming interface (API) provided by the process, first mobile application performance data associated with a first mobile application running on the mobile device, wherein the API is configured to enable data communication between the process and the first mobile application;
receiving, at the process, via the API, second mobile application performance data associated with a second mobile application running on the mobile device, the second mobile application being different from the first mobile application, wherein the API is further configured to enable data communication between the process and the second mobile application;
calculating, at the process, a performance metric based at least in part on the first mobile application performance data and the second mobile application performance data; and
sending the performance metric from the mobile device to a server,
wherein the first mobile application and the second mobile application comprise code associated with a software development toolkit configured to enable communication with the process using the API.

15. The method of claim 14, wherein the first mobile application performance data includes information associated with at least one of:
availability of the first mobile application;
performance speed of the first mobile application;
feature usage associated with the first mobile application;
debug information associated with the first mobile application;
advertisement information associated with the first mobile application;
business metrics associated with the first mobile application;
one or more errors associated with the first mobile application; and
network connectivity of the first mobile application.

16. The method of claim 14, wherein the first mobile application performance data is sent by the first mobile application according to a predetermined schedule.

17. The method of claim 14, wherein the first mobile application performance data is received in response to an error associated with the first mobile application.

18. The method according to claim 14, further comprising:
generating a performance report associated with the first application, wherein the performance report is based at least in part on a correlation between the first mobile application performance data and at least one of: a status datum associated with one or more components of the mobile device; an environmental datum defined by an operating system installed on the mobile device; a status datum associated with a communication network to which the mobile device is connected; or a third performance datum associated with the first application; and
sending the performance report from the mobile device to a server.

* * * * *